United States Patent [19]

Goff

[11] 4,209,030

[45] Jun. 24, 1980

[54] CONTROL DEVICE

[75] Inventor: Clifford E. Goff, Knoxville, Tenn.

[73] Assignee: RobertShaw Controls Company, Richmond, Va.

[21] Appl. No.: 942,059

[22] Filed: Sep. 13, 1978

[51] Int. Cl.² .............................................. G05D 16/00

[52] U.S. Cl. ......................................... 137/84; 137/85

[58] Field of Search ............................... 137/84, 85, 86

[56] References Cited

U.S. PATENT DOCUMENTS 4,099,539 7/1978 Brakebill ............................ 137/85 X

*Primary Examiner*—Alan Cohan

*Attorney, Agent, or Firm*—Candor, Candor & Tassone

[57] ABSTRACT

A self-contained control device for a system having a first source provided with a changeable fluid pressure value and a second source provided with a changeable vacuum value and having a pressure operated control unit that changes its operating condition in relation to the value of the pressure signal directed thereto, the control device having pneumatically operated control means adapted to be operatively interconnected to the sources and the control unit for increasing the pressure signal from the first source to the unit as the pressure value from the first source increases from a first value thereof to a second value thereof and for thereafter decreasing the pressure signal from the first source to the unit as the pressure value from the first source further increases from the second value thereof to a third value thereof. The control means are adapted to produce the signal in substantially the same manner but at different values for different levels of vacuum at the second source. The control device comprises at least three housing plates disposed in stacked relation and the control means comprise a plurality of pneumatically operated relays defined in part by the housing plates and each having diaphragms disposed between certain of the housing plates. Each relay has a chamber confined within an intermediate housing plate receiving the vacuum from the second source.

20 Claims, 8 Drawing Figures

CONTROL DEVICE

BACKGROUND OF THE INVENTION

1. Field of the Invention

This invention relates to an improved control device, such as for controlling the operation of an exhaust gas recirculation valve for an internal combustion engine of a transportation vehicle or the like.

2. Prior Art Statement

It is known to provide a self-contained control device for an exhaust gas recirculation system for an internal combustion engine having a first source provided with a changeable fluid pressure value and a second source provided with a changeable vacuum value and having a pressure operated control unit that changes its operating condition in relation to the value of the pressure signal directed thereto and controls the amoung of exhaust gas recirculation. The self-contained control device has pneumatically operated control means adapted to be operatively interconnected to the sources and to the control unit for increasing the pressure signal from the first source to the unit as the pressure value from the first source increases from a first value thereof to a second value thereof and for thereafter decreasing the pressure signal from the first source to the unit as the pressure value from the first source further increases from the second value thereof to a third value thereof, the control means being adapted to produce the signal in substantially the same manner but at different values for different levels of vacuum at the second source thereof. The control device comprises at least three housing plates disposed in stacked relation and the control means comprise a plurality of pneumatically operated relay means defined in part by the housing plates and each having diaphragm means disposed between certain of of the housing plates.

For example, see the following patent application: (1) Ser. No. 800,211 filed May 25, 1977 and now issued as U.S. Pat. No. 4,099,539.

SUMMARY OF THE INVENTION

It was found according to the teachings of this invention that the prior known self-contained control device of aforementioned patent application Ser. No. 800,211, filed May 25, 1977 requires the housing structure that contains the compression springs for the relays thereof to be sealed from the exterior of the control device as the spring chambers are utilized to receive the vacuum signal from the vacuum manifold for the respective relay means.

Accordingly, it is a feature of this invention to provide an improved self-contained control device of the above type that will still provide the same functions as the prior known control device of aforementioned Ser. No. 800,211, while permitting the chambers that contain the compression springs for the relay means thereof to be at atmospheric pressure so that sealing of such spring chambers is not required.

It is another feature of this invention to provide improved cover means for such a self-contained control device wherein the cover means itself can be utilized for adjusting the forces of the springs for the relay means.

In particular, one embodiment of this invention provides a self-contained control device for a system having a first source provided with a changeable fluid pressure value and a second source provided with a changeable vacuum value and having a pressure operated control unit that changes its operating condition in relation to the value of a pressure signal directed thereto, the control device having pneumatically operated control means adapted to be operatively interconnected to the sources and the control unit for increasing the pressure signal from the first source to the unit as the pressure value from the first source increases from a first value thereof to a second value thereof and for thereafter decreasing the pressure signal from the first source to the unit as the pressure value from the first source further increases from the second value thereof to the third value thereof. The control means is adapted to produce the signal in substantially the same manner but at different values for different levels of vacuum at the second source thereof. The control device comprises at least three housing plates disposed in stacked relation and the control means comprises a plurality of pneumatically operated relay means defined in part by the housing plates and each having diaphragm means disposed between certain of the housing plates. The relay means each has means confined in an intermediate housing plate for receiving the vacuum from the second source.

In this manner, the chambers containing the compression springs for the relay means can be maintained at atmospheric pressure so that such chambers need not be sealed from the exterior of the control device as in the aforementioned prior known control device.

Accordingly, it is an object of this invention to provide an improved self-contained control device having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
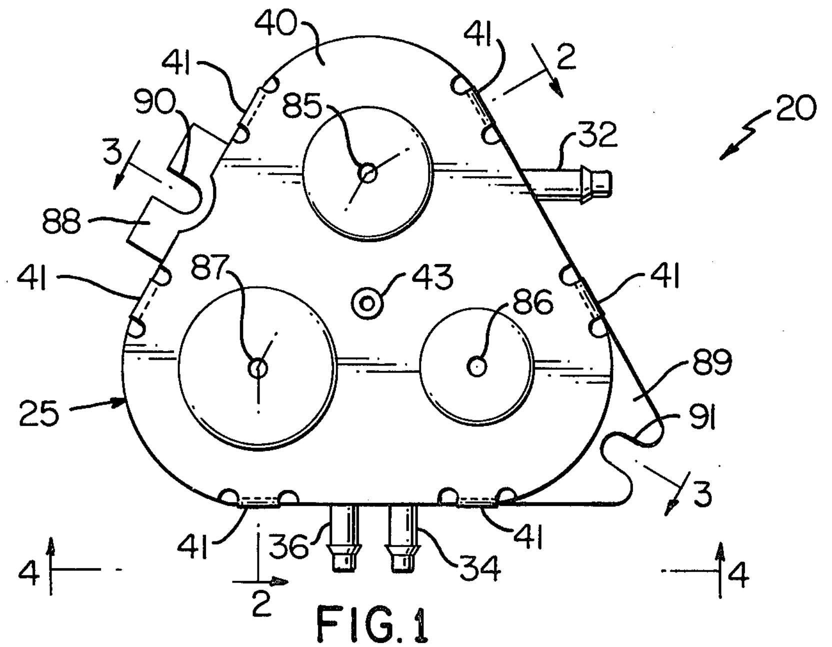
FIG. 1 is a top view of one embodiment of the improved control device of this invention.
Figure 4:
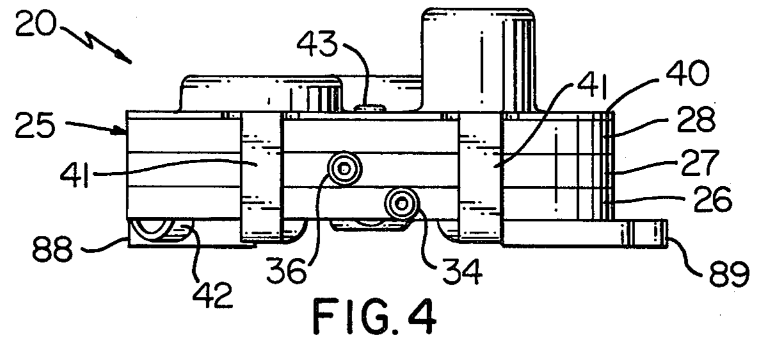
FIG. 4 is a front view of the control device of FIG. 1 and is taken in the direction of the line 4—4 of FIG. 1.
Figure 5:
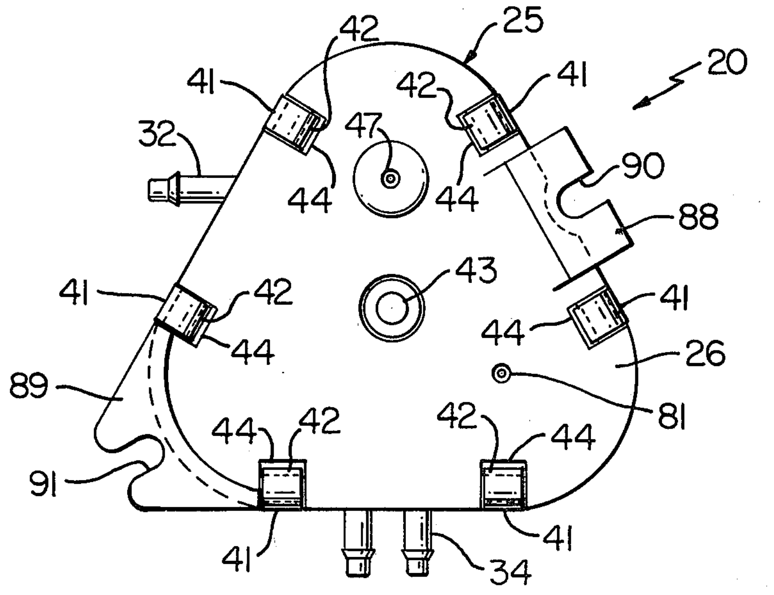
FIG. 5 is a rear view of the control device of FIG. 1.

While the various features of this invention are hereinafter described and illustrated as being particularly adapted to provide a self-contained control device for controlling an exhaust gas recirculation valve for an internal combustion engine of a transportation vehicle or the like, it is to be understood that the various features of this invention can be utilized singly or in any combination thereof to provide a control device for conditioning a pressure signal for other apparatus as desired.

Therefore, this invention is not to be limited to only the embodiments illustrated in the drawings, because the drawings are merely utilized to illustrate one of the wide variety of uses of this invention.

Figure 2:
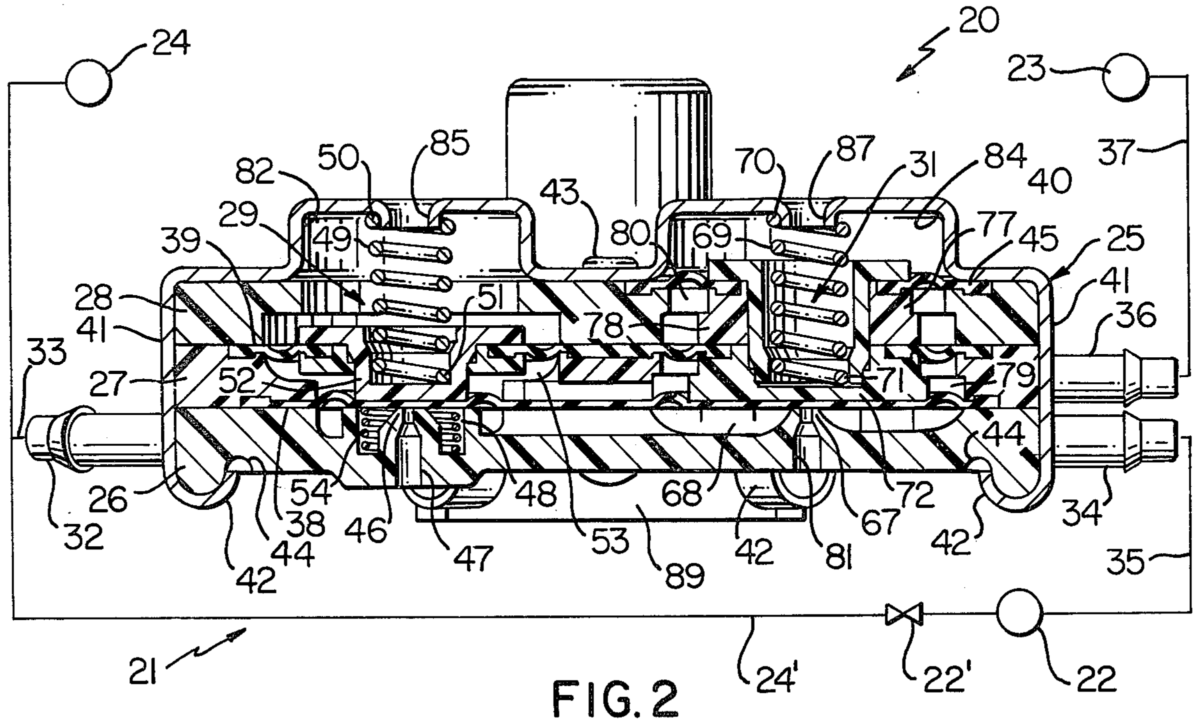
FIG. 2 is an enlarged cross-sectional view taken on line 2—2 of FIG. 1, FIG. 2 also schematically illustrating a control system utilizing the control device of FIG. 1 therein.
Figure 3:
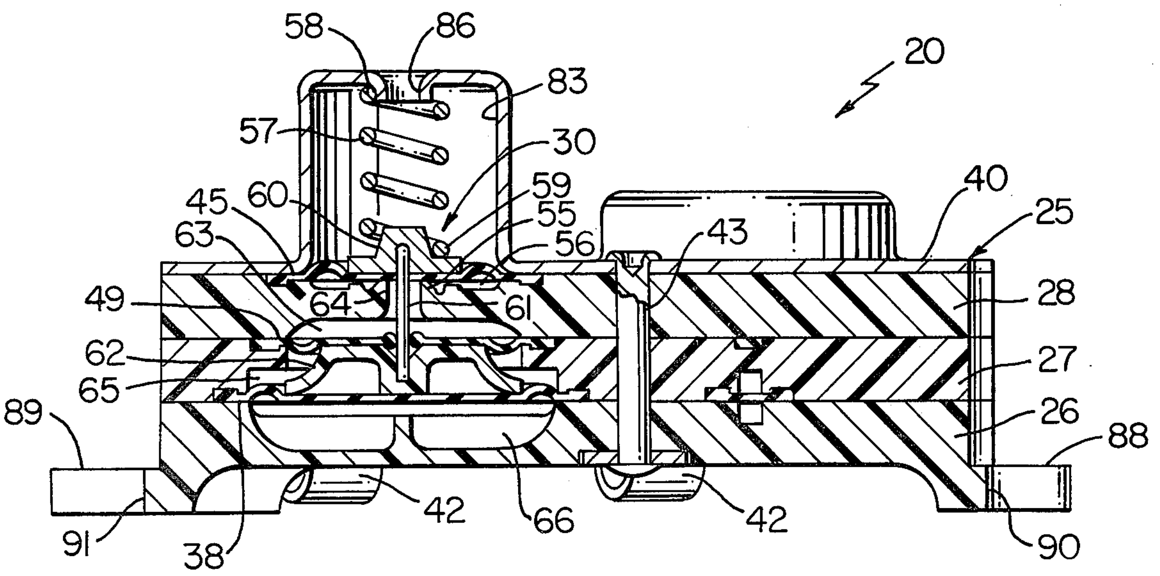
FIG. 3 is an enlarged cross-sectional view taken on line 3—3 of FIG. 1.

Referring now to FIGS. 1, 2 and 3, the improved self-contained control device of this invention is generally indicated by the reference numeral 20 and is adapted to be utilized in the control system that is generally indicated by the reference numeral 21 in FIG. 2 and comprises an exhaust gas recirculation system for an internal combustion engine (not shown) for the purpose fully set forth in aforementioned patent application, Ser. No. 800,211.

In particular, it is known that engine control systems for internal combustion engines have been provided with each having an exhaust gas recirculation valve for taking part of the exhaust gas of the internal combustion engine and diverting the same back into the intake manifold to be again utilized in the internal combustion engine for pollution control purposes. However, the degree of the exhaust gas recirculation must be regulated according to various engine parameters, such as the RPM speed of the engine, the value of the manifold absolute pressure, etc.

Accordingly, aforementioned patent application, Ser. No. 800,211, provides a self-contained control device for an exhaust gas recirculation engine control system wherein the exhaust gas recirculation valve is pressure operated and pneumatically operated control means of the self-contained control device are provided for increasing a pressure signal from the engine air pump pressure supply to the exhaust gas recirculation valve as the engine RPM speed increases from a first value to a second value and for thereafter decreasing the pressure signal from the supply to the valve as the engine RPM speed further increases from the second value thereof to a third value thereof, the control means of the control device producing the signal in substantially the same manner but at different values for different levels of vacuum at the manifold vacuum thereof.

In this manner, the exhaust gas recirculation valve progressively opens as the signal thereto progressively increases and progressively closes as the signal thereto progressively decreases.

As previously stated, the improved self-contained device 21 of this invention accomplishes the same functions as the self-contained device of aforementioned patent application, Ser. No. 800,211, but has improved structure as well as an improved method of making the same as will be apparent hereinafter.

As illustrated in FIG. 2, the system 21 includes a pressure source 22, such as the air pump pressure supply means operated by the internal combustion engine for supplying air pressure to the system 21 that increases as the engine speed increases in a manner well known in the art.

The system 21 also includes a vacuum source 23, such as the intake manifold of the internal combustion engine that produces a manifold absolute pressure and directs the same to the system 21.

The system 21 includes a pressure operated control unit 24, such as a pressure operated exhaust gas recirculation valve for recirculating a portion of the exhaust gas to the intake manifold of the engine in a progressively increasing manner as the output signal pressure to the unit 24 progressively increases and to progressively decrease the amount of the exhaust gas recirculation to the intake manifold of the engine as the output signal pressure to the unit 24 progressively decreases for the reasons previously set forth.

The pressure source 22 is interconnected to the pressure operated unit 24 by a conduit 24' that has a restriction 22' therein for a purpose hereinafter described.

The self-contained control device 20 of this invention includes a housing means that is generally indicated by the reference numeral 25 and comprises a plurality of substantially flat housing plates 26, 27 and 28 formed of plastic or any suitable material disposed in stacked relation and having been suitably formed and ported in a manner well known in the art to receive and contain therein a plurality of pneumatically operated relay means or control means 29, 30 and 31 that operate in a manner hereinafter described so as to regulate the output pressure in the line 24' to the unit 24 by an output nipple 32 that is interconnected to the output line 24' leading to the pneumatically operated unit 24 by a conduit means 33.

The relay means 29, 30 and 31 are adapted to receive fluid pressure through an inlet nipple 34 that is interconnected to the pressure source 22 by a conduit means 35 and be influenced by the vacuum value of the vacuum source 23 by a nipple 36 being interconnected to the vacuum source 23 by a conduit means 37.

Since it is well known in the art to provide internal passages in control devices made from a plurality of stacked housing plates so as to direct fluid to and from various chambers of control means disposed therein, such interconnecting porting and passages for the control device 20 of this invention need not be described. However, the individual chambers for the pneumatically operated relays 29, 30 and 31 and the movable parts thereof will now be described.

As illustrated in FIGS. 2 and 3, a flexible diaphragm means 38 is disposed between the housing plates 26 and 27 while another flexible diaphragm means 39 is disposed between the housing plates 27 and 28 whereby it can be seen that the housing plate 27 comprises an intermediate housing plate having the diaphragm means 38 and 39 disposed on opposite sides thereof for a purpose hereinafter described.

A cover member 40 forms part of the housing means 25 of the self-contained control device 20 and is disposed against the outboard housing plate 28 while having a plurality of legs or arms 41 extending around the stack of housing plates 26–28 in a manner to have their free ends 42 bent against the other outboard housing plate 26 to hold not only the cover member 40 to the housing plates 26–28, but also to hold the housing plates 26–28 in the stacked relation illustrated.

In order to further secure the housing plates 26–28 and cover member 40 together, a central rivet-like fastening means 43 is utilized to fasten the members 26–28 and cover member 40 together as illustrated.

Another flexible diaphragm means 45 is disposed between the housing plate 28 and the cover member 40 to form part of the pneumatically operated relay means 30 and 31 as will be apparent hereinafter.

The pneumatically operated relay or control means 29 includes a valve seat 46 formed in the housing plate 26 and leading to the atmosphere through a vent port 47 of the housing plate 26, the valve seat 46 being surrounded by a chamber 48 formed in the housing plate 26 and facing the flexible diaphragm 38. The flexible diaphragm 38 is urged against the valve seat 46 to close the same by a compression spring 49 having one end 50 bearing against the cover member 40 and the other end 51 bearing against a cup-shaped spring retainer 52 carried by the flexible diaphragm 39 and being surrounded by a chamber 53 formed in the intermediate housing plate 27 between the flexible diaphragms 38 and 39.

A small compression spring 54 is disposed in the chamber 48 and bears against the diaphragm 38 in a direction to tend to move the diaphragm 38 away from the valve seat 46, the compression spring 54 being relatively small in force in comparison to the force of the compression spring 49.

The chamber 48 of the relay means 29 is adapted to be interconnected by the nipple 34 to the pressure source 22. The intermediate chamber 53 of the relay 29 is interconnected to the nipple 36 and, thus, to the vacuum manifold 23 and the effective areas of the diaphragms 38 and 39 are such that the resulting effective pressure differential acting across the diaphragms 38 and 39 from a vacuum condition being created in the intermediate chamber 53 is to assist the compression spring 49 in tending to maintain the diaphragm 38 in a closed condition against the valve seat 46 while the force of the compression spring 54 and the force of the pressure fluid in the chamber 48 tend to open the valve seat 46 as will be apparent hereinafter.

The pneumatically operated relay or control means 30 has a valve seat 55 formed in the housing plate 28 and is surrounded by a chamber 56 formed between the housing plate 28 and the diaphragm 45, the diaphragm 45 normally being urged to close the valve seat 55 from the chamber 56 by a compression spring 57 having one end 58 bearing against the cover member 40 while the other end 59 thereof bears against a spring retainer 60 disposed against the flexible diaphragm 45 and having a valve stem 61 projecting through the diaphragm 45 and valve seat 55 to be secured to a movable spacer 62 disposed between the diaphragms 39 and 38 as illustrated.

The relay 30 includes a chamber 63 formed in the housing plate 28 and being disposed between the housing plate 28 and the flexible diaphragm 39 and being disposed in fluid communication with the valve seat 55 by a passage 64 formed through the housing plate 28. The spacer 62 of the relay means 30 cooperates with the diaphragms 38 and 39 as well as with the intermediate housing plate 27 to define a chamber 65 between the diaphragms 38 and 39 as illustrated. In addition, the housing plate 26 is formed to define a chamber 66 between the housing plate 26 and the diaphragm 38 as illustrated.

The chamber 56 of the relay means 30 is adapted to be interconnected to the output chamber 48 of the relay means 29 and, thus, to the output nipple 32 for a purpose hereinafter described. The chamber 65 of the relay means 30 is adapted to be interconnected by the nipple 36 to the vacuum source 23 with the effective areas of the diaphragms 38 and 39 being such that the resulting effective pressure differential acting across the diaphragms 38 and 39 from the evacuation of the chamber 65 is to tend to move the valve stem 61 in a direction to open the valve seat 55 in opposition to the force of the compression spring 57, the output pressure in the chamber 56 likewise tending to operate on the diaphragm 45 in a direction to tend to open the valve seat 55.

The chamber 63 of the relay means 30 is interconnected to the atmosphere through suitable vent means (not shown) in the housing means 25 and the chamber 66 is adapted to be interconnected to the pressure source 22 by the nipple means 34 whereby the force of the pressure fluid in the chamber 66 likwise tends to move the diaphragm 45 away from the valve seat 55 for a purpose hereinafter described.

The pneumatically operated relay or control means 31 has a valve seat 67 formed in the housing plate 26 and being surrounded by a chamber 68 formed in the housing plate 26 between the housing plate 26 and the diaphragm 38 which is normally urged to close the valve seat 67 by a compression spring 69 having one end 70 bearing against the cover member 40 and the other end 71 bearing against a movable spacer 72 disposed between the diaphragms 38 and 39. Another spacer 77 is disposed between the diaphragms 39 and 45 while a tubular member 78 is secured to the spacers 72 and 77 so that the spacers 72 and 77 move in unison with the tubular member 78 that provides room for the compression spring 69 to bear directly against the spacer 72 as illustrated.

The spacer 72 cooperates with the diaphragms 39 and 38 to define a chamber 79 between the diaphragms 38 and 39 and surrounding the spacer 72 while the spacer 77 cooperates with the diaphragms 39 and 45 to define a chamber 80 between the diaphragms 39 and 45 and surrounding the spacer 77.

The chamber 68 of the relay means 31 is interconnected to the pressure output nipple 32 and, thus to the pressure operated unit 24 while the chamber 79 is interconnected to the vacuum nipple 36 with the effective areas of the diaphragms 38 and 39 being such that the resulting effective pressure differential across the diaphragms 38 and 39 by the chamber 79 being evacuated is to tend to move the diaphragm 38 to an open condition relative to the valve seat 67 which is interconnected to a vent port 81 formed through the housing plate 26. Likewise, the force of the pressure fluid in the chamber 68 tends to move the diaphragm 38 to an open condition relative to the valve seat 67.

The chamber 80 of the relay means 31 is interconnected to the pressure source nipple 34 and, thus, to the pressure source 22 with the effective areas of the diaphragms 38 and 45 being such that the resulting effective pressure differential across the same tends to move the spacer stack 72, 77 in a direction to aid the compression spring 69 in tending to maintain the diaphragm 38 closed against the valve seat 67 for a purpose hereinafter described.

The cover member 40 is so formed that the same defines a plurality of spring wells 82, 83 and 84 respectively to accomodate the compression springs 49, 57 and 69 as illustrated with the wells 82–84 being respectively interconnected to the atmosphere by vent openings 85, 86 and 87 respectively being formed in the domed end of the wells 82–84 and defining spring retainers for the ends 50, 58 and 70 of the compression springs 49, 57 and 69 as illustrated.

Further, by merely inserting a proper tool into a particular vent opening 85, 86 or 87 and pushing inwardly or outwardly on the domed end of the respective well 82, 83 or 84, the force of the respective compression spring 59, 57 or 69 can be set to the desired level thereof. In this manner, by merely deforming the wells 82–84 of the cover member 50, the spring forces for the relay means 29–31 can be mechanically set.

If desired, the housing plate 26 can be provided with suitable feet extensions 88 and 89 and be respectively provided with suitable notches 90 and 91 to permit the control device 20 to be mounted to any suitable structure in a manner well known in the art.

From the above, it can be seen that the self-contained control device 20 of this invention can be formed by the method of this invention to operate in a manner now to be described.

The relay means or first controller 31 is so constructed and arranged that it is adapted to produce an output signal in its output chamber 68 and, thus, in the output nipple 32 and the pneumatically operated unit 24 that progressively increases as the input pressure provided by the pressure source and input nipple 34 to the chamber 80 increases in a manner hereinafter described, the output pressure signal being permitted to exist in the conduit 33 increases because the vacuum in the chamber 79 produced by the vacuum source 23 tends to open the diaphragm 38 away from the valve seat 67 to decrease the value of the signal in the chamber 68 by interconnecting the same to the atmosphere through the valve seat 67 while the pressure in the chamber 80 and the force of the compression spring 69 tends to close the diaphragm 38 against the valve seat 67 in opposition to the force of vacuum in the chamber 79 and the pressure in the chamber 68 acting against the diaphragm 38 in a direction tending to open the valve seat 67. Thus, as long as the pressure from the source 22 to the chamber 80 increases, the relay 31 tends to increase the pressure signal in the conduit 24′ leading to the unit 24.

The relay means or second controller 30 tends to produce a decreasing output signal once the input pressure from the source 22 reaches a certain value.

For example, the valve member diaphragm 45 of the relay means 30 is held against the valve seat 55 by the force of the compression spring 57 in opposition to the force of the vacuum in the chamber 65 and the force of the pressure from the source 22 in the chamber 66 acting on the diaphragm 38 in a direction to open the valve seat 55. At a certain output pressure value of the source 22, the force in the chamber 66 acting on the diaphragm 38 in a direction to tend to open the valve seat 55 is subsequently reached whereby the diaphragm 45 is moved away from the valve seat 55 to interconnect the chamber 56 to the atmosphere through the now opened valve seat 55 and decrease the signal in the output nipple 32 and, thus, decrease the output signal in the conduit 24′ leading to the pneumatically operated unit 24 in a progressive manner as the pressure valve at the pressure source 22 continues to increase for a purpose hereinafter described.

The relay means 29 or third controller 29 acts in a manner similar to a pressure regulator whereby the same maintains or assures that the value of the pressure signal in the output nipple 32 does not exceed a certain value for different values of the vacuum at the source 23. In particular, the third controller 29 will not permit the output signal in the output nipple 32 to increase above a certain value for each level of vacuum at the source 23 because the diaphragm 38 is held closed against the valve seat 46 by the vacuum in the chamber 53 and the force of the compression spring 49 in opposition to the force of the compression spring 54 and the pressure in the chamber 48 acting on the diaphragm 38 in a direction that tends to open the valve seat 46 and dump the pressure in the chamber 48 and, thus, in the nipple 32 and conduit 24′ to the atmosphere through the vent opening 47.

Thus, it can be seen that the relay means or controllers 29–31 are, in effect, all connected in parallel to the pressure source 22 downstream from the restrictor 22′ thereof by the nipple 32 and each of the relays 29–31 will attempt to generate its own particular output signal in the conduit 24′ leading to the unit 24. However, at any combination of inputs from the devices 22 and 23, one of the three relay means 29, 30 or 31 will be producing a lower output than the other two and it will be in control as the other two relays in their attempt to produce their own outputs will close and in effect become inoperative whereby only one relay 29, 30 or 31 will be controlling at any one time and producing the signal in the output nipple 32 that will be directed to the pneumatically operated device 24 to operate the same for an exhaust gas recirculation means as previously described.

Therefore, assuming that the pressure source 22 is beginning to increase the pressure value thereof from a first pressure value and the vacuum source 23 will be producing a vacuum at a constant value throughout the operation of the system 21, the pressure signal being permitted by the output nipple 32 to be directed by the conduit 24′ to the pneumatically operated unit 24 will progressively increase until the pressure value of the pressure source 22 reaches a second value thereof whereby the unit 24 will progressively open its valve means to progressively direct more exhaust gas back to the engine intake manifold.

In particular, as the input pressure from the source 22 increases from zero to the first pressure value thereof, the force of the compression spring 69 of the controller 31 tends to maintain the diaphragm 38 in its closed position against the valve seat 67 in opposition to the resulting force of the vacuum in the chamber 79 tending to open the diaphragm 38 away from the valve seat 67 whereby the force of the pressure fluid from the source 22 passing through the restrictor 22′ to the conduit 24′ and, thus, to the unit 24 is vented to the atmosphere through the open valve seat 67. However, once the force of the output pressure 22 in the chamber 80 of the relay means 31 reaches approximately the aforementioned first pressure value thereof and progressively increases from such value, the diaphragm 38 is progressively closed toward the valve seat 67 to cause the signal pressure in the chamber 68 to progressively build up in a linear manner until the pressure valve at the pressure source 22 reaches a second value thereof.

At this time, when the output pressure value from the source 22 now reaches approximately the second pressure value thereof, the source pressure in the chamber 66 acting on the diaphragm 38 of the second relay means 30 is now adapted to overcome the force of the compression spring 57 and permit the diaphragm 45 to open away from the valve seat 56 to cause the value of the pressure signal in the chamber 56 and, thus, in output nipple 32 to now decrease substantially linearly as the pressure value of the pressure at the source 22 further progressively increases from the second pressure value thereof to the third pressure value thereof.

During such operation, the relay means 29 will prevent the value of the signal in the output nipple 32 from increasing above a certain value as determined by the particular level of vacuum at the vacuum source 23 so that the controller 29 does not normally affect the value of the signal in the output nipple 32 during the operation of the system 21. However, if the pressure value of the signal being produced in the output nipple 32 would increase beyond that certain value, the valve seat 46 will open by the combination of the pressure acting in the chamber 48 against the diaphragm 38 and the force of the compression spring 54 being greater than the effective force of the vacuum value in the chamber 53 and the force of the compression spring 49 tending to maintain the diaphragm 38 closed against the valve seat 46 whereby the relay means 29 would vent the pressure in the output nipple 32 back to the atmosphere through the vent port 47 to prevent the force of the output fluid in the output nipple 32 from increasing beyond the certain value setting of the relay 29.

Thus, it can be seen for any vacuum value of the vacuum source 23, the relay means 31 will operate to maintain an increasing output signal in the output nipple 32 and, thus, to the pneumatically operated unit 24 to progressively increase the amount of exhaust gas recirculation as the magnitude of the output pressure from the source 22 progressively increases from a first pressure value to a second pressure value at which point a further progressive increase in the output pressure of the source 22 from the second value thereof to a third value will cause the relay means 30 to cause a progressive decrease in the signal to the unit 24 whereby the unit 24 will progressively decrease the amount of exhaust gas recirculation while the relay means 29 will prevent the output signal in the output nipple 32 from increasing beyond a certain value for the particular vacuum value of the source 23 at that time.

Accordingly, it can be seen that the system 21 conditions the signal being sent to the control unit 24 in relation to the pressure value being produced at the pressure source 22 so that the signal to the unit 24 increases substantially linearly in value as the pressure value of the source 22 increases from a first pressure value to a second pressure value and thereafter decreases substantially linearly in value as the pressure value of the source further increases from the second value thereof to a third value thereof, the system 21 producing such a conditional signal in substantially the same manner for each different level of vacuum that is produced at the vacuum source 23 but at different values in relation to the different levels of vacuum at the vacuum source 23.

Therefore, it can be seen that the self-contained control device 20 of this invention is adapted to operate in substantially the same manner as the self-contained control device of the aforementioned patent application, Ser. No. 800,211, while permitting the vacuum chambers for the relays to be confined in the intermediate housing plate 27 thereof so that the spring wells 82, 83 and 84 can be at atmospheric pressure.

Figure 6:
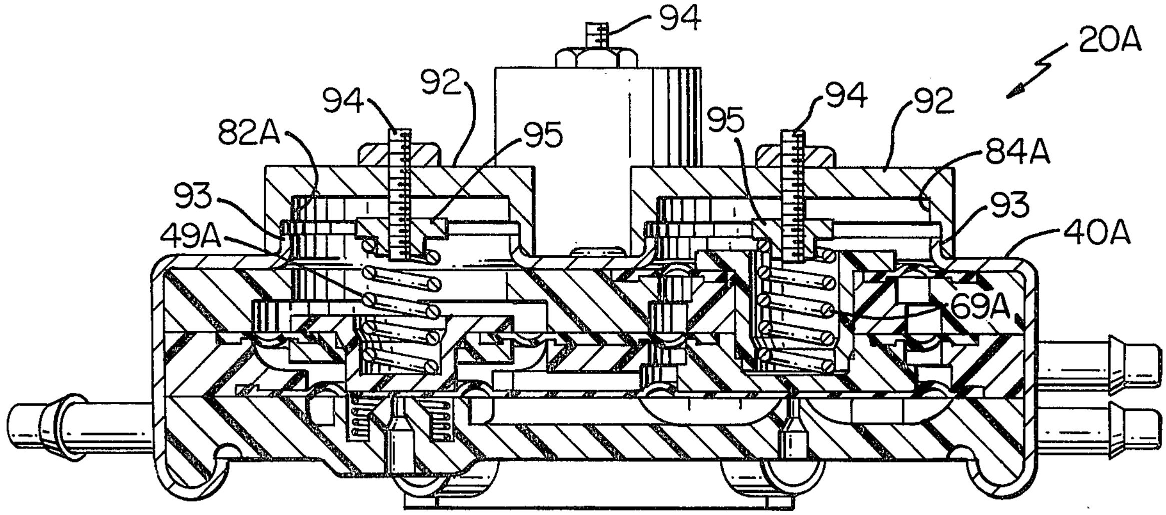
FIG. 6 is a view similar to FIG. 2 and illustrates another embodiment of the control device of this invention.
Figure 7:
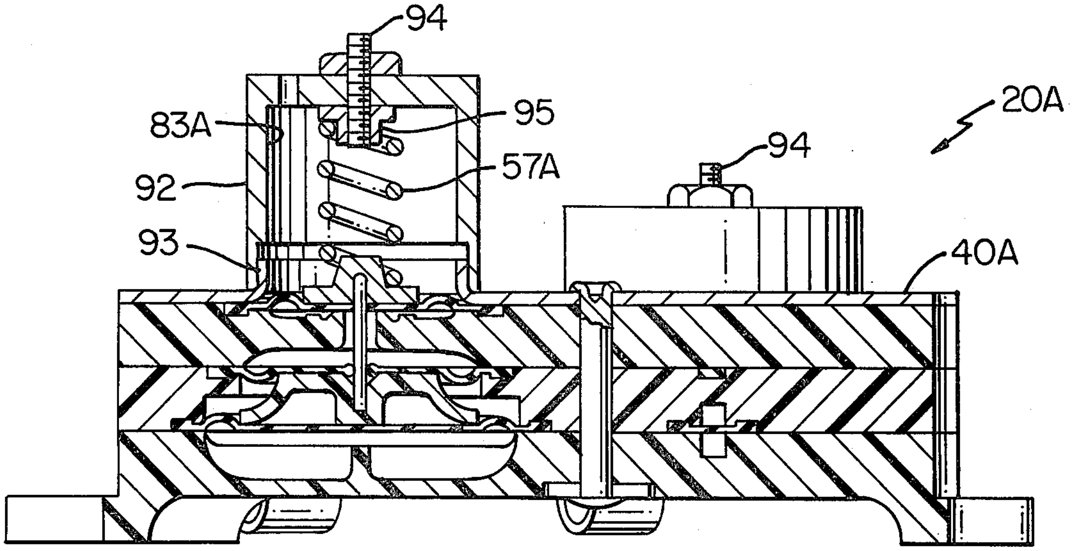
FIG. 7 is a view similar to FIG. 3 and illustrates the control device of FIG. 6.

Should it be desired to have the springs 49, 47 and 69 more adjustable than can be provided by the deforming the wells 82, 83 and 84 of the cover member 40 of the self-contained control device 20 in the manner previously described, the cover member 40 can be formed in the manner illustrated in FIGS. 6 and 7.

In particular, another self-contained control device of this invention is generally indicated by the reference numeral 20A in FIGS. 6 and 7 and parts thereof similar to the control device 20 previously described are indicated by like reference numerals followed by the reference letter "A".

As illustrated in FIGS. 6 and 7, the cover member 40A has the wells 82A, 83A and 84A formed by additional cup-shaped housing members 92 telescope over corresponding tubular sections 93 of the cover member 40A and secured thereto in any suitable manner with the cup-shaped members 92 carrying threaded adjusting members 94 having spring retainer 95 thereon and against which the springs 49A, 57A and 69A can bear as illustrated. In this manner, by merely changing the position of the threaded retainers 95 on the threaded adjusting members 94 by rotating the threaded adjusting member 94, the force of the compression springs 49A, 57A and 69A can be set to any desired force thereof for the reasons previously set forth.

Figure 8:
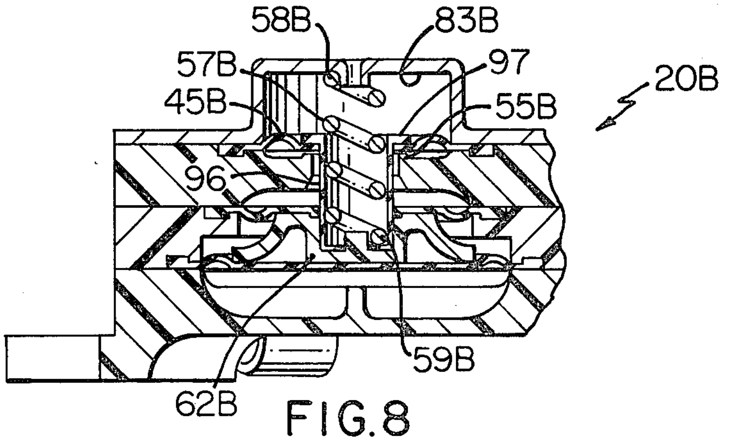
FIG. 8 is a fragmentary view similar to FIG. 7 and illustrates another embodiment of the control device of this invention.

While the spring well 83 of the cover member 40 of the self-contained control device 20 previously described appears taller than the wells 82 and 84, the spring 57 and well 83 could be rearranged in the manner illustrated in FIG. 8 to permit the well 83 to be externally shorter.

In particular, another self-contained control device of this invention is generally indicated by the reference numeral 20B in FIG. 8 and parts thereof similar to the control device 20 previously described are indicated by like reference numerals followed by the reference letter "B".

As illustrated in FIG. 8, it can be seen that the valve seat 55B has been made larger in diameter so that a cup-shaped tubular member 96 can be inserted therethrough to bear against the modified spacer 62B and have one end 59B of the compression spring 57B engage thereagainst so that the other end 58B of the spring 57B can bear against a shortened cover member well 83B as illustrated. In this manner, the diaphragm portion 45B will be urged against the valve seat 55B by the outwardly directed annular flange 97 of the cup-shaped member 96 that is sealed to the diaphragm 45B and is urged in a direction to close the diaphragm 45B against the valve seat 55B by the force of the compression spring 57B in the manner previously described. Thus the length of the compression spring 57B is the same as the length of the compression spring 57 without requiring as tall a spring well 83B in the cover member 40B therefor.

Therefore, it can be seen that this invention not only provides an improved self-contained control device for an exhaust gas recirculation system for an internal combustion engine or the like, but also this invention provides a method of making such an improved self-contained control device.

While the forms of this invention now preferred have been illustrated and described as required by the Patent Statute, it is to be understood that other forms can be utilized and still fall within the scope of the appended claims.

What is claimed is:

1. In a self-contained control device for a system having a first source provided with a changeable fluid pressure value and a second source provided with a changeable vacuum value and having a pressure operated control unit that changes its operating condition in relation to the value of a pressure signal directed thereto, said control device having pneumatically operated control means adapted to be operatively interconnected to said sources and said control unit for increasing said pressure signal from said first source to said unit as the pressure value from said first source increases from a first value thereof to a second value thereof and for thereafter decreasing said pressure signal from said first source to said unit as the pressure value from said first source further increases from said second value thereof to a third value thereof, said control means being adapted to produce said signal in substantially the same manner but at different values for different levels of vacuum at said second source thereof, said control device comprising at least three housing plates disposed in stacked relation, said control means comprising a plurality of pneumatically operated relay means defined in part by said housing plates and each having diaphragm means disposed between certain of said housing plates, the improvement wherein said relay means each has means confined within an intermediate housing plate for receiving said vacuum from said second source.

2. A control device as set forth in claim 1 wherein each said means of said relay means that is confined within said intermediate housing plate comprises a chamber defined in said intermediate housing plate and defined in part by a pair of said diaphragm means of the respective relay means.

3. A control device as set forth in claim 2 wherein said pair of said diaphragm means of each said relay means are respectively disposed between said intermediate housing plate and a pair of said housing plates respectively disposed on opposite sides of said intermediate housing plate.

4. A control device as set forth in claim 1 wherein each said relay means includes a compression spring carried by said housing plates and a control member operated by said spring.

5. A control device as set forth in claim 4 wherein a cover member is secured to said housing plates, said springs respectively bearing against said cover member and said control members.

6. A control device as set forth in claim 5 wherein said cover member has a plurality of well means therein which respectively receive said springs therein.

7. A control device as set forth in claim 6 wherein said cover member has means interconnecting said well means thereof to the atmosphere.

8. A control device as set forth in claim 6 wherein said well means respectively have means for adjusting the force of said springs.

9. A control device as set forth in claim 8 wherein said means for adjusting said force of said springs comprises means for deforming said well means.

10. A control device as set forth in claim 8 wherein said means for adjusting said force of said springs comprises a plurality of threaded adjusting means respectively carried by said well means.

11. A control device as set forth in claim 5 wherein said cover member has a plurality of arms deformed around said housing plates to hold said housing plates together.

12. A control device as set forth in claim 1 wherein said relay means are so constructed and arranged that only one of said relay means is adapted to effectively cause said increasing pressure signal from said first source to said unit as the pressure value from said first source increases from said first value thereof to said second value thereof.

13. A control device as set forth in claim 1 wherein said relay means are so constructed and arranged that only one of said relay means is adapted to effectively cause said decreasing pressure signal from said first source to said unit as the pressure value from said first source further increases from said second value thereof to said third value thereof.

14. A control device as set forth in claim 1 wherein said relay means are so constructed and arranged that only one of said relay means is adapted to prevent said pressure signal from said first source to said unit from increasing beyond a certain value when the level of vacuum at said second source thereof is at a certain level.

15. A control device as set forth in claim 1 wherein said relay means comprise first, second and third relays being so constructed and arranged that only said first relay is adapted to effectively cause said increasing pressure signal from said first source to said unit as the pressure value from said first source increases from said first value to said second value, that only said second relay is adapted to effectively cause said decreasing pressure signal from said first source to said unit as the pressure value from said first source further increases from said second value to said third value, and that only said third relay is adapted to effectively prevent said pressure signal from increasing beyond a certain value when the level of vacuum at said second source thereof is at a certain value.

16. A control device as set forth in claim 5 wherein at least one of said relay means includes a tubular sealing member projecting into said intermediate plate, said one relay means having its respective spring projecting into said tubular sealing member.

17. A control device as set forth in claim 16 wherein said tubular member abuts the control member of said one relay means.

18. A control device as set forth in claim 17 wherein said tubular member has an opening adjacent said control member of said one relay means, said spring for said one relay means extending through said opening of said tubular member to engage said control member of said one relay means.

19. A control device as set forth in claim 17 wherein said tubular member has a closed end abutting said control member of said one relay means, said spring for said one relay means engaging said end of said tubular member.

20. A control device as set forth in claim 17 wherein said tubular member has an annular flange at one end thereof sealing engaging one of said diaphragm means of said control device.

* * * * *